Patented Oct. 8, 1929

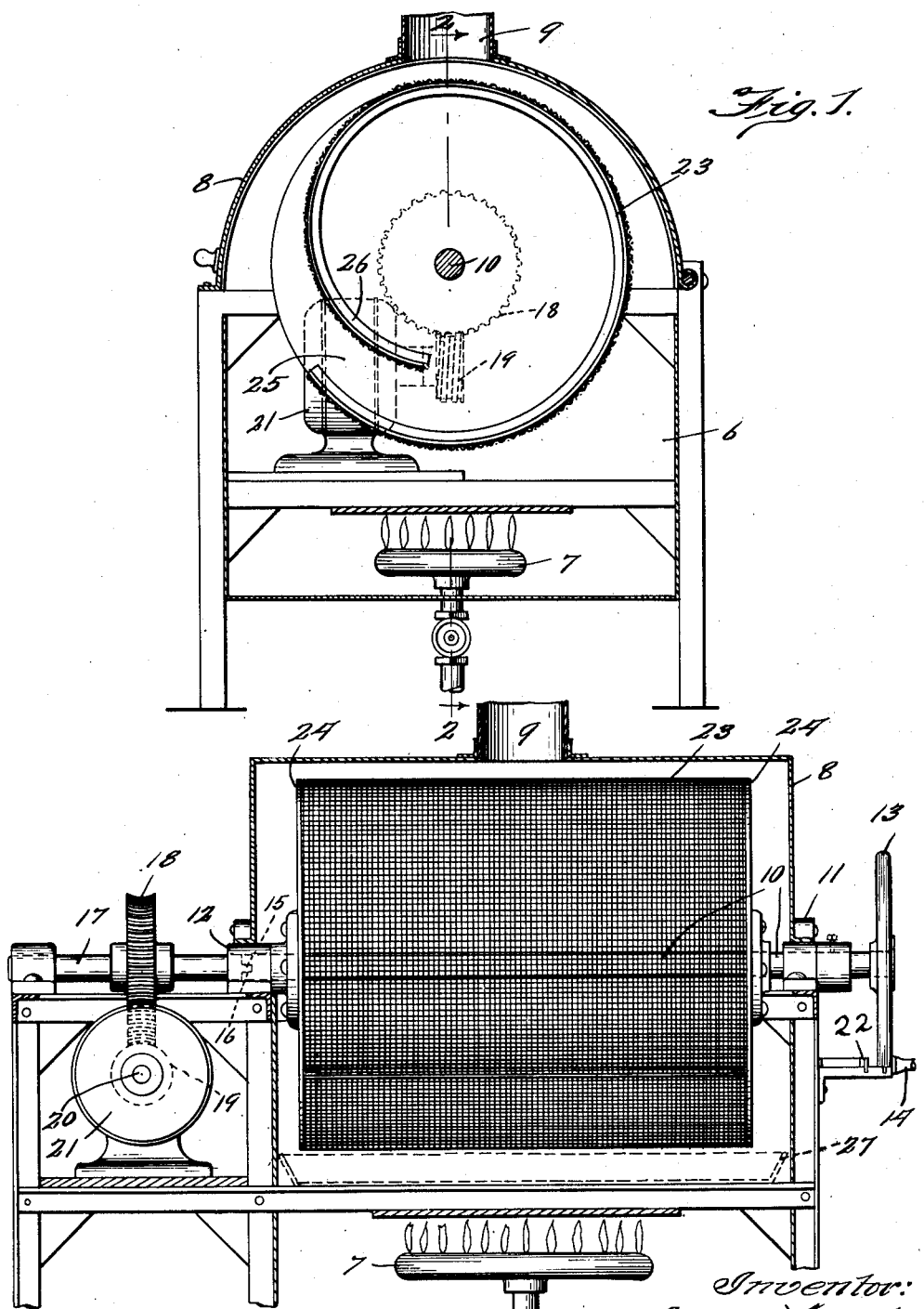

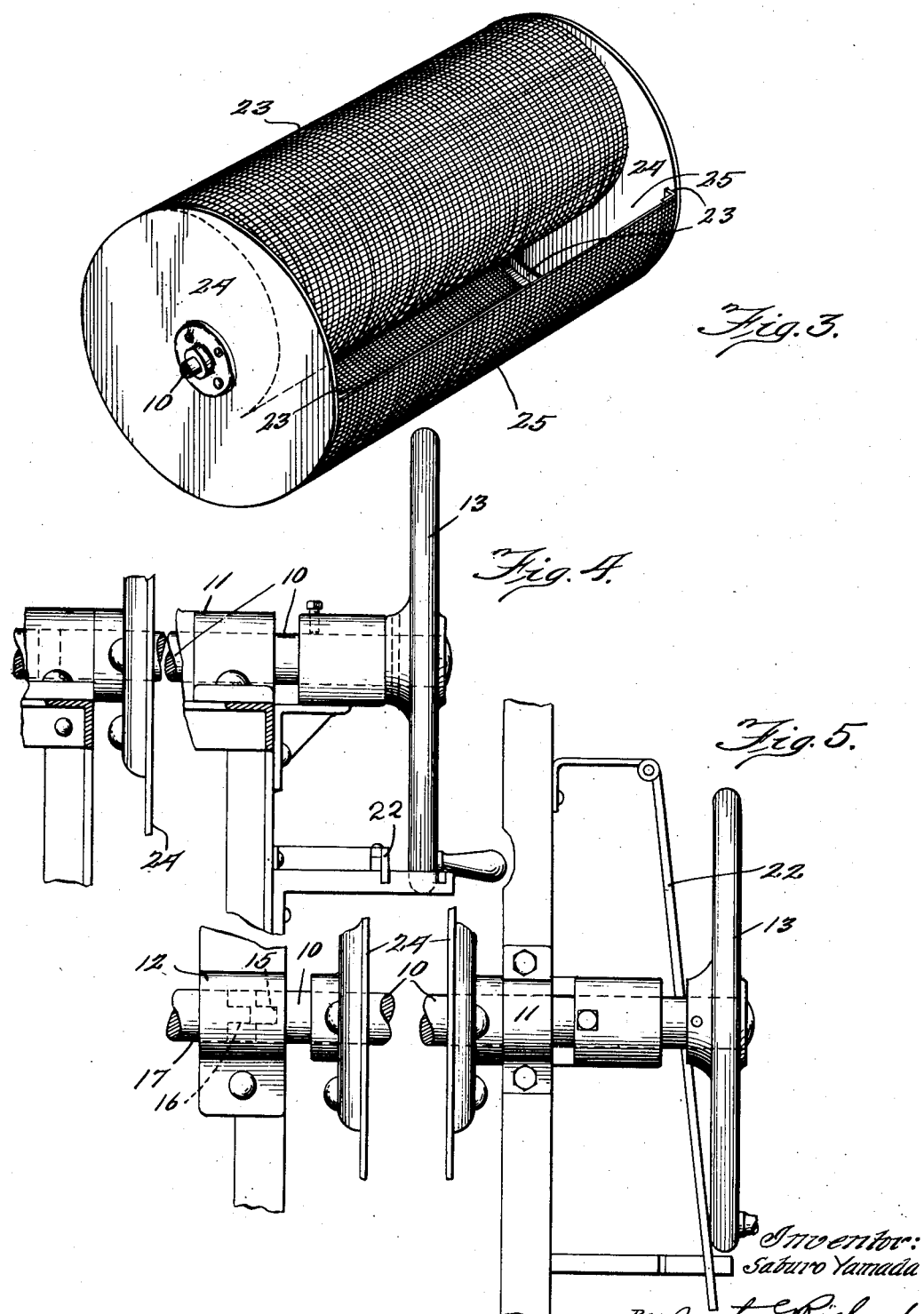

1,730,550

UNITED STATES PATENT OFFICE

SABURO YAMADA, OF SAN FRANCISCO, CALIFORNIA

ROASTER FOR CHESTNUTS AND THE LIKE

Application filed September 19, 1928. Serial No. 306,842.

The invention relates to improvements in roasters especially adapted for use in roasting chestnuts and the like, and has for its primary object the provision of an improved apparatus of this character, by means of which chestnuts and the like may be properly roasted in a highly efficient and economical manner.

Another object of the invention is the provision of an apparatus of this character having improved means of discharge for the roasted material.

Another object of the invention is the provision of an apparatus of this character which shall be highly efficient in use and capable of economical manufacture.

Other objects will appear hereinafter.

The invention consists of the combinations and arrangements of parts hereinafter described and claimed.

The invention will be best understood by reference to the accompanying drawings forming a part of this specification, and in which Fig. 1 is a vertical transverse section of an apparatus embodying the invention.

Fig. 2, a longitudinal section taken substantially on line 2—2 of Fig. 1.

Fig. 3, a perspective view of a roasting receptacle employed in the apparatus.

Fig. 4, a detail view of one end of the operating shaft of the apparatus, and

Fig. 5, a more extended detail view of said operating shaft showing the same in discharging position.

The preferred form of construction as illustrated in the drawings comprises a suitable oven chamber, preferably made as indicated, of sheet metal, supported on a suitable frame, and preferably lined with asbestos, or the like, to retain the heat, said oven chamber being supplied with heat by means of a suitable gas burner 7, as shown. The oven chamber 6 is provided with an upwardly swinging cover 8 giving access to the interior thereof, and an escape flue 9 is detachably connected with said cover 8 for carrying off the burned products of combustion.

An operating shaft 10 is arranged in the upper portion of the oven chamber 6, said operating shaft being mounted in suitable bearings 11 and 12 at opposite sides of said oven chamber. The operating shaft 10 is projected at one end from said oven chamber and provided with a hand wheel 13 and a crank handle 14 for manual manipulation thereof. The shaft 10 is mounted as shown in the bearings 11 and 12 so as to be capable of longitudinal movement therein. At its end within the bearing 12 the shaft 10 is provided with a transverse notch 15 cooperating with a smaller tongue 16 formed on the end of a drive shaft 17, mounted as shown, in axial alignment with the shaft 10. The drive shaft 17 carries a worm wheel 18 meshing with a worm 19 on the shaft 20 of an electric motor 21, and whereby the shaft 10 will be normally driven in the direction of the arrow on Fig. 1. By longitudinally shifting the shaft 10, it may be disengaged from the drive shaft 17 and then manually rotated independently of the shaft 17 by means of the crank handle 14. A stop lever 22 is operatively connected with a shaft 10 to facilitate longitudinal placing thereof for disengaging said shaft from the drive shaft 17, as will be readily understood.

A foraminated roasting receptacle 23 is mounted on the shaft 10 within the chamber 6, said receptacle having imperforate end plates 24 and a cylindrical periphery of wire mesh material, as shown. The receptacle 23 is provided in its periphery with a transverse discharge opening 25 traversing said periphery longitudinally, one side 26 of the periphery of said receptacle being extended inwardly and circumferentially to overlap the other side of said opening, as best shown in Figs. 1 and 3.

In operation the material to be roasted, such as chestnuts, or the like, is placed in a receptacle 23 by raising the lid or cover 8. The lid 8 is then closed. The flue pipe 9 is reconnected therewith, and the burner 7 lighted. The receptacle 23 is then slowly rotated in the direction of the arrow on Fig. 1 until the chestnuts, or other material, is thoroughly roasted. A receptacle 27 is then inserted in the oven chamber 6 under the receptacle 23, the shaft 10 shifted longitudinally to disengage it from the shaft 17, and the receptacle 23 rotated in the reverse direction by means of the crank handle 14. This causes the roasting chestnuts to discharge from the opening 25 into the pan 27, permitting their ready removal from the oven chamber. In this way the chestnuts, or other material, will be subjected to a slow and uniform heating, and will be, therefore, evenly, slowly and uniformly roasted throughout, rendering them palatable and delicious of taste. The specific arrangement of parts constitutes a simple and effective one for the purpose.

While I have illustrated and described the preferred form of construction for carrying my invention into effect, this is capable of variation and modification without departing from the spirit of the invention. I therefore do not wish to be limited to the precise details disclosed, but desire to avail myself of such variations and modifications as fall within the scope of the appended claims.

Having thus fully described my invention, what I claim as new and desire to secure by Letters Patent is:

1. Apparatus of the class described comprising an oven chamber; a rotatable receptacle in said chamber; means constructed for permitting rotation of said receptacle in one direction without discharge of its contents and effecting discharge of said contents upon rotation in the other direction; and means for rotating said receptacle in the opposite directions.

2. Apparatus of the class described comprising an oven chamber; a rotatable receptacle in said chamber; means constructed for permitting rotation of said receptacle in one direction without discharge of its contents and effecting discharge of said contents upon rotation in the other direction; power driven means for rotating said receptacle in one direction; and manually operable means for rotating said receptacle in said other direction.

3. Apparatus of the class described comprising an oven chamber; a rotatable foraminated receptacle in said chamber; means constructed for permitting rotation of said receptacle in one direction without discharge of its contents and effecting discharge of said contents upon rotation in the other direction; and means for rotating said receptacle in the opposite directions.

4. Apparatus of the class described comprising an oven chamber; a rotatable foraminated receptacle in said chamber; means constructed for permitting rotation of said receptacle in one direction without discharge of its contents and effecting discharge of said contents upon rotation in the other direction; power driven means for rotating said receptable in one direction; and manually operable means for rotating said receptacle in said other direction.

5. Apparatus of the class described comprising an oven chamber; a rotatable receptacle in said chamber having a discharge opening traversing its periphery, the edges of said opening being overlapped; and means for rotating said receptacle in opposite directions.

6. Apparatus of the class described comprising an oven chamber; a rotatable receptacle in said chamber having a discharge opening traversing its periphery, the edges of said opening being overlapped; power driven means for rotating said receptacle in said one direction; and manually operable means for rotating said receptacle in said other direction.

7. Apparatus of the class described comprising an oven chamber; a shaft traversing said chamber and capable of longitudinal movement therein; a receptacle in said chamber mounted on said shaft in said chamber; means constructed for permitting rotation of said receptacle in one direction without discharge of its contents and effecting discharge of said contents upon rotation in the other direction; a drive shaft operatively connected with said first mentioned shaft at one end, the connection between said shafts disengaging upon longitudinal movement of said first mentioned shaft; manually operable means at the other end of said shaft for rotating the same; and power means for driving said shaft.

8. Apparatus of the class described comprising an oven chamber having an upwardly swinging top; a shaft traversing said oven chamber; a foraminated cylindrical receptacle mounted on said shaft within said oven chamber, said receptacle having a discharge opening traversing its periphery, the edges of said opening being overlapped; a hand wheel at one end of said shaft; a drive shaft in axial alignment with the other end of said first mentioned shaft, there being a tongue and notch connection between said shafts, and said first mentioned shaft being mounted for longitudinal movement to permit of disengagement of said shafts; and an electric motor having a gear connection with said drive shaft.

In witness whereof, I have hereunto set my hand this 11th day of September, 1928.

SABURO YAMADA.